United States Patent
Hodges

(10) Patent No.: US 11,502,503 B2
(45) Date of Patent: Nov. 15, 2022

(54) SWITCHGEAR ARRESTOR SYSTEM WITH ISOLATORS

(71) Applicant: Christopher Joseph Hodges, Lakeland, FL (US)

(72) Inventor: Christopher Joseph Hodges, Lakeland, FL (US)

(*) Notice: Subject to any disclaimer, the term of this patent is extended or adjusted under 35 U.S.C. 154(b) by 0 days.

(21) Appl. No.: 16/409,772

(22) Filed: May 10, 2019

(65) Prior Publication Data

US 2021/0066906 A1   Mar. 4, 2021

(51) Int. Cl.
| | |
|---|---|
| *H02H 3/22* | (2006.01) |
| *H02H 7/22* | (2006.01) |
| *H02H 9/06* | (2006.01) |
| *H02B 5/06* | (2006.01) |
| H02H 1/04 | (2006.01) |
| H01H 83/10 | (2006.01) |
| H02B 1/24 | (2006.01) |
| H02H 9/02 | (2006.01) |

(52) U.S. Cl.
CPC .............. *H02H 3/22* (2013.01); *H02B 5/06* (2013.01); *H02H 7/222* (2013.01); *H02H 9/06* (2013.01); *H01H 83/10* (2013.01); *H02B 1/24* (2013.01); *H02H 1/04* (2013.01); *H02H 9/02* (2013.01)

(58) Field of Classification Search
CPC ............ H02H 3/22; H02H 7/222; H02H 9/06; H02H 1/04; H02H 9/02; H02H 9/04; H02B 5/06; H02B 1/24; H01H 83/10; H01H 33/16; H01H 33/02; H01H 33/161

USPC ........................................ 361/117–120, 128
See application file for complete search history.

(56) References Cited

U.S. PATENT DOCUMENTS

| | | | | |
|---|---|---|---|---|
| 3,697,819 A | * | 10/1972 | Eichelberger .......... | H02B 13/02 361/603 |
| 4,369,480 A | * | 1/1983 | Crucius .................. | H01C 7/123 361/128 |
| 4,710,850 A | * | 12/1987 | Jahn ...................... | H01L 25/112 174/150 |
| 5,317,473 A | * | 5/1994 | Lundquist ................. | H01T 4/14 361/117 |
| 5,444,429 A | * | 8/1995 | Sakich ..................... | H01C 7/12 338/21 |
| 2018/0351335 A1 | * | 12/2018 | Whaley .................. | H02B 1/202 |

* cited by examiner

*Primary Examiner* — Danny Nguyen
(74) *Attorney, Agent, or Firm* — Cygnet IP Law, P.A.; Stephen W. Aycock, II

(57) ABSTRACT

A switch gear system is described. In some implementations, a switch gear arrestor system can include a switch gear and one or more arrestors mounted on a non-conductive insulated bar. The one or more arrestors can be connected to one or more isolators through a respective aperture in the non-conductive insulated bar. Each arrestor can be connected to one of the one or more electrical energy sources at a first end and can be connected to one of the one or more isolators at a second end. The switch gear arrestor system can further include one or more ground leads. Each ground lead can connect one of the one or more isolators to a conductive grounding bar.

14 Claims, 3 Drawing Sheets

SWITCHGEAR ARRESTOR SYSTEM WITH ISOLATORS

FIELD

Some implementations relate generally to switchgear arrestor systems, and more particularly, to a switchgear arrestor system with one or more isolators and a method for isolating one or more arrestors in a switchgear system.

BACKGROUND

Some existing switchgear arrestors may be commonly used to protect electrical circuits and appliances from over-voltage. Commonly used switchgear arrestors may be mounted on a conductive (e.g., metal) bar that is grounded. The arrestor may be designed to pull excess load to ground upon receiving the over-voltage. But, in most cases, the arrestor may short out internally, causing the arrestor to stay connected to ground. The arrestor staying connected to ground can result in the arrestor overheating, catching fire, or blowing up and damaging the switchgear cabinet constituents/components.

It may be desirable to provide a new and improved switchgear arrestor system that, after the arrestor pulls the over/excess voltage/load to ground, prevents the arrestor from burning or blowing up and causing damage to other components/parts/constituents within the switchgear cabinet in which the arrestor is mounted. Some implementations were conceived in light of the above-mentioned limitations, needs, or problems, among other things.

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

SUMMARY

Some implementations include a switchgear arrestor system. The switchgear arrestor system can include a switchgear having a switchgear cabinet, wherein the switchgear can include one or more electrical energy sources within the switchgear cabinet. The switch gear arrestor system can also include one or more arrestors mounted on a non-conductive insulated bar within the switchgear cabinet. The one or more arrestors can be connected to one or more isolators disposed within the switchgear cabinet through a respective aperture in the non-conductive insulated bar. The non-conductive insulated bar can be attached to an interior of the switchgear cabinet via/through one or more insulated mounting bar connectors. The one or more electrical energy sources can include a first phase electrical energy source, a second phase electrical energy source and/or a third phase electrical energy source.

Each arrestor can be connected to one of the one or more electrical energy sources at a first end and can be connected to one of the one or more isolators at a second end. The switchgear arrestor system can further include one or more ground leads. Also, each ground lead can connect one of the one or more isolators to a conductive grounding bar.

A method for isolating an arrestor in a switchgear system can include mounting the arrestor on a non-conductive insulated bar. The method can also include connecting the arrestor to an isolator through an aperture in the non-conductive insulated bar at a first end and to an electrical energy source of the switchgear system at a second end. The method can further include connecting the isolator to a conductive grounding bar via a ground lead.

Some implementations include a switchgear arrestor system. The switchgear arrestor system can include a switchgear. The switchgear arrestor system can also include one or more arrestors mounted on a non-conductive insulated bar. The one or more arrestors can be connected to one or more isolators through a respective aperture in the non-conductive insulated bar. The non-conductive insulated bar can be attached to a switchgear cabinet via/through one or more insulated mounting bar connectors. The switchgear arrestor system can further include one or more ground leads. Also, each ground lead can connect one of the one or more isolators to a conductive grounding bar.

DETAILED DESCRIPTION

Figure 1:
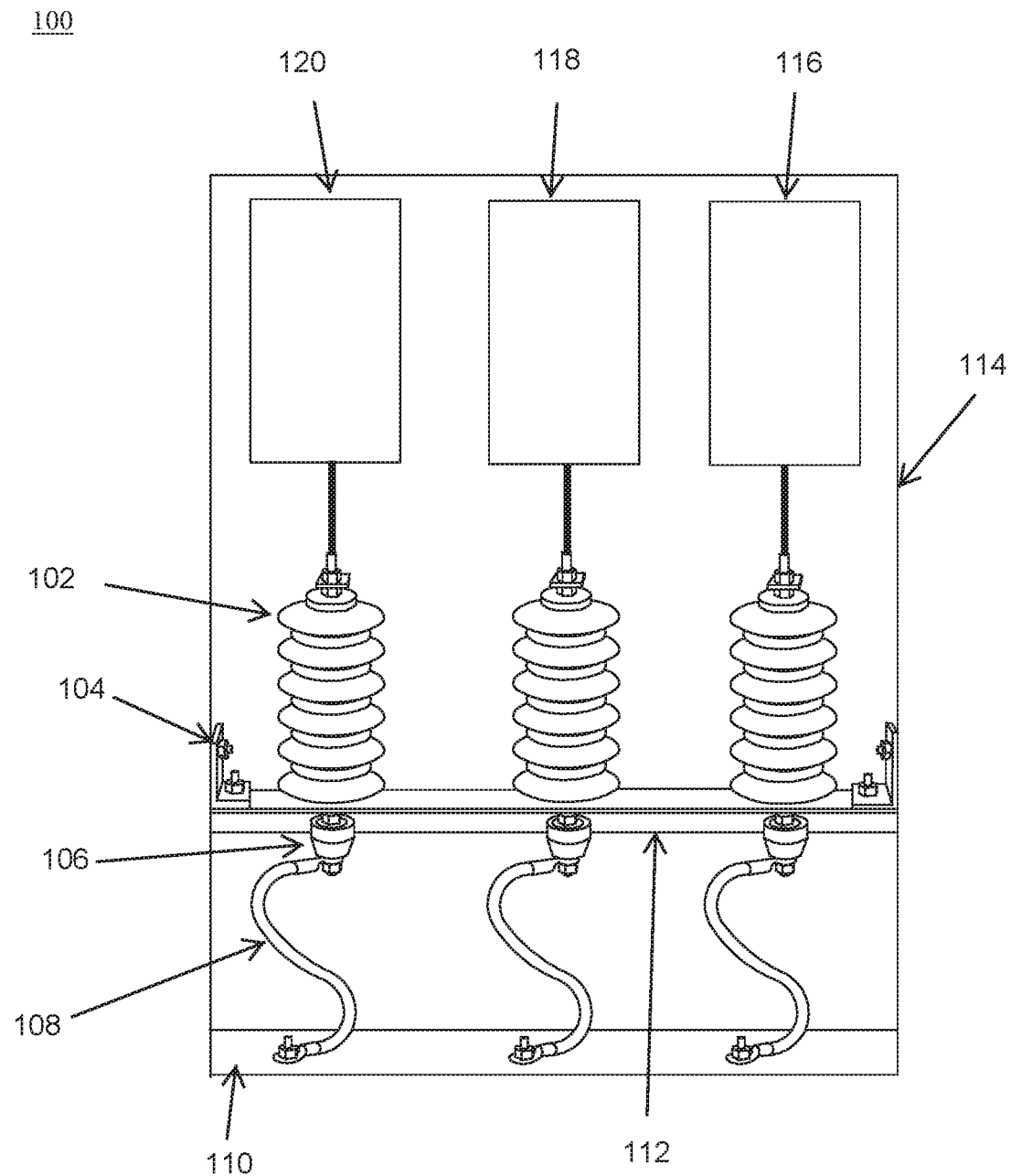
FIG. 1 is a diagram showing a front view of an example switchgear arrestor system with isolators in accordance with some implementations.

FIG. 1 shows a diagram of a front view of an example switchgear arrestor system with isolators in accordance with some implementations. The switchgear arrestor system can include a switch gear 100 with electrical energy sources 116, 118 and 120. In some implementations, 116 can be a first phase electrical energy source, 118 can be a second phase electrical energy source, and 120 can be a third phase electrical energy source. The switchgear arrestor system can also include one or more arrestors 102 (e.g., one for each phase of electrical energy) mounted on a non-conductive insulated bar 112 and connected to one or more isolators 106 (e.g., one for each phase of electrical energy or for each arrestor) through one or more respective apertures in the non-conductive insulated bar 112.

Each arrestor 102 can be connected to one of the one or more electrical energy sources (116/118/120) at a first end and/or to one of the one or more isolators 106 at a second end. The switchgear arrestor system can further include one or more ground leads 108 (e.g., one for each phase of electrical energy or for each isolator), wherein each ground lead 108 can connect an isolator 106 to a conductive grounding bar 110.

The switchgear arrestor system can be enclosed within a switchgear cabinet 114 and the non-conductive insulated bar 112 can be attached to the switchgear cabinet 114 via one or more insulated mounting bar connectors 104. The arrestors 102 can be mounted on the non-conductive insulated bar 112 and can be connected to the isolators 106 via the non-conductive insulated bar through one or more respective apertures in the non-conductive insulated bar described above.

An example process/method for isolating an arrestor in a switchgear cabinet of a switchgear system can include mounting the arrestor on a non-conductive insulated bar and connecting the arrestor to an isolator through the non-conductive insulated bar at a first end and connecting the arrestor to an electrical energy source of the switchgear system at a second end.

In some implementations, one step can include mounting an arrestor 102 on a non-conductive insulated bar 112. Another step can include connecting the arrestor 102 to an electrical energy source (e.g., 116/118/120) at one end. Yet another step can include connecting the arrestor 102 to an isolator 106 at the other end through an aperture in the non-conductive insulated bar. Also, the isolator 106 can be connected to one end of a ground lead 108 while the ground lead 108 can in turn be connected to a conductive grounding bar 110 in another step.

Figure 2:
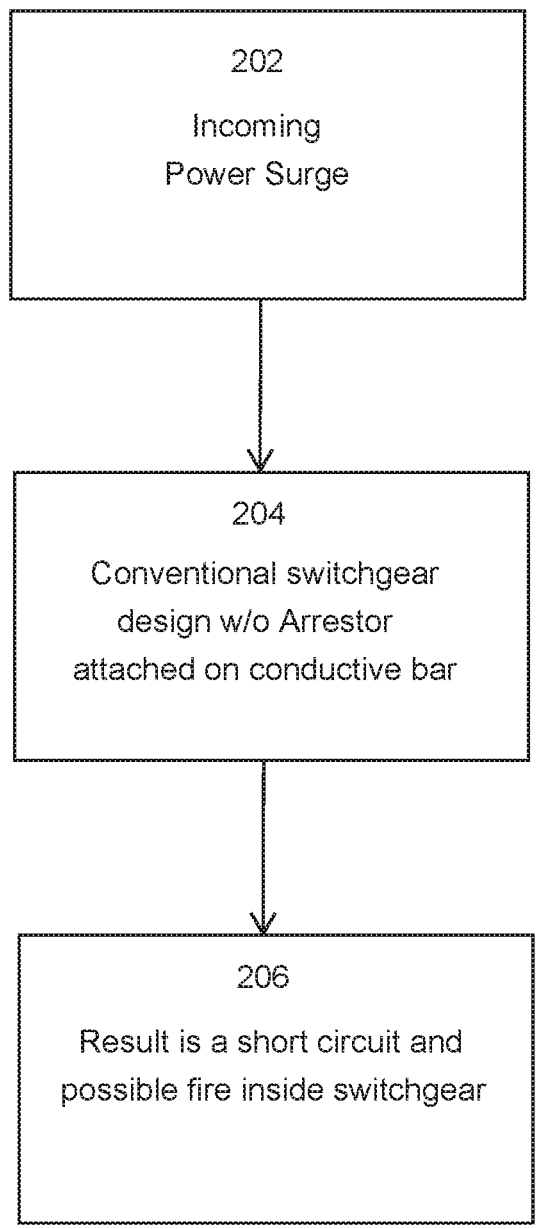
FIG. 2 is an illustrative process flow corresponding to a conventional switchgear system.
Figure 3:
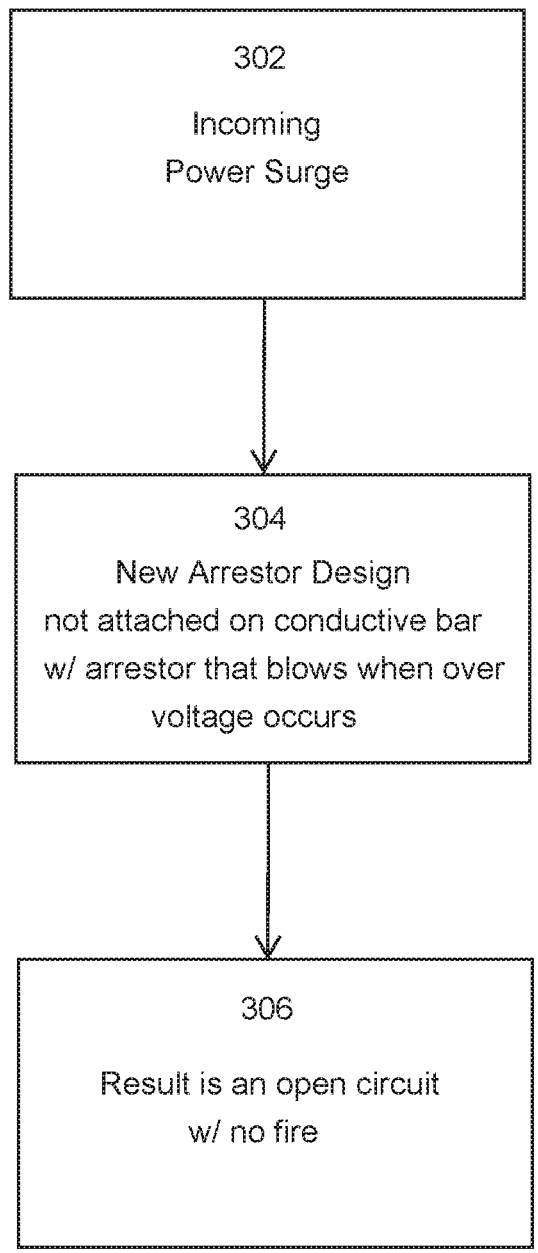
FIG. 3 is an illustrative process flow corresponding to the disclosed switchgear system.

FIG. 2 shows an illustrative process flow corresponding to the working of a conventional switchgear system. An incoming power surge (202) enters a conventional switchgear system with arrestors attached to a conductive bar (204), which leads to a short-circuit and potential fire inside the switchgear system (206). FIG. 3 shows an illustrative process flow corresponding to the working of the disclosed switchgear system. An incoming power surge (302) enters the disclosed switchgear system with arrestors attached to non-conductive insulated bar and isolators that burn out in response to over-voltage (304), leading to an open-circuit with no short-circuit/fire (306).

A benefit of the disclosed switch gear arrestor system with isolator is that arrestors can be mounted on a non-conductive bar and connected to isolators, which can connect to ground. After an arrestor pulls excess voltage to ground, an isolator prevents the arrestor from blowing up and causing damage to other components of the switch gear cabinet. The isolator can achieve this by burning out (due to passing the excess voltage) and disconnecting the arrestor from the ground.

A switch gear arrestor system with isolator may be used to protect electrical circuits and appliances from over/excess voltage/load in some implementations. It will be appreciated that the switch gear arrestors described herein are for illustration purposes only and are not intended to be limiting. Other types of switch gears or arrestors can be used depending on a contemplated implementation.

The arrestor can include a standard arrestor that has been selected based on the voltage that the arrestor is constructed to handle based on a contemplated design of the switch gear. The isolator can include an isolator that has been selected to break connection as a given voltage and/or current based on the contemplated design of the switchgear. The ground lead can be made of conductive metal. The non-conductive insulated bar can be made of fiberglass, plastic, or other nonconductive material suitable for use within a switchgear housing. The conductive grounding bar can be made of conductive metal such as copper, steel, etc.

It will also be appreciated that the isolators described herein are for illustration purposes only and not intended to be limiting. Other types of isolators can be used depending on a contemplated implementation.

It will further be appreciated that the non-conductive insulated mounting bar and apertures described herein are for illustration purposes only and are not intended to be limiting. Other types of non-conductive insulated mounting bars (e.g., fiberglass mounting bars) can be used depending on a contemplated implementation.

Also, it will be appreciated that the insulated mounting bar connector, the ground lead and the conductive grounding bus bar described herein are for illustration purposes only and are not intended to be limiting. Other types of insulated mounting bar connectors, ground leads and/or conductive grounding bus bars can be used depending on a contemplated implementation.

It will be appreciated that any dimensions described herein are for illustration purposes only and are not intended to be limiting. Other dimensions could be used depending on a contemplated implementation.

It is therefore apparent that there is provided, in accordance with the various example implementations disclosed herein, a switch gear arrestor system with isolators.

While the disclosed subject matter has been described in conjunction with a number of implementations, it is evident that many alternatives, modifications and variations would be or are apparent to those of ordinary skill in the applicable arts. Accordingly, Applicant intends to embrace all such alternatives, modifications, equivalents and variations that are within the spirit and scope of the disclosed subject matter.

What is claimed is:

1. A switchgear arrestor system comprising:
   a switchgear including a switch gear cabinet, wherein the switchgear includes one or more electrical energy sources disposed within the switch gear cabinet;
   one or more arrestors disposed within the switchgear cabinet and mounted on a non-conductive insulated bar and connected to one or more isolators disposed within the switchgear cabinet through a respective aperture in the non-conductive insulated bar, wherein each arrestor is connected to one of the one or more electrical energy sources at a first end and to one of the one or more isolators at a second end; and
   one or more ground leads disposed within the switchgear cabinet, wherein each ground lead connects one of the one or more isolators to a conductive grounding bar disposed within the switchgear cabinet.

2. The switchgear arrestor system of claim 1, wherein the non-conductive insulated bar is attached to the switchgear cabinet via one or more insulated mounting bar connectors.

3. The switchgear arrestor system of claim 1, wherein the one or more arrestors include an arrestor selected based on a design of the switchgear.

4. The switchgear arrestor system of claim 1, wherein the one or more isolators are selected based on a design of the switchgear.

5. The switchgear arrestor system of claim 1, wherein the one or more ground leads are made of a conductive metal.

6. The switchgear arrestor system of claim 1, wherein the non-conductive insulated bar is made of fiberglass.

7. The switchgear arrestor system of claim 1, wherein the conductive grounding bar is made of conductive metal.

8. The switchgear arrestor system of claim 1, wherein the one or more electrical energy sources include a first phase electrical energy source, a second phase electrical energy source and a third phase electrical energy source.

9. A switchgear arrestor system comprising:
   a switch gear;
   one or more arrestors mounted on a non-conductive insulated bar and connected to one or more isolators through a respective aperture in the non-conductive insulated bar, wherein the non-conductive insulated bar is attached to a switchgear cabinet via one or more insulated mounting bar connectors; and
   one or more ground leads, wherein each ground lead connects one of the one or more isolators to a conductive grounding bar.

10. The switchgear arrestor system of claim 9, wherein the one or more arrestors include an arrestor selected based on a design of the switchgear.

11. The switchgear arrestor system of claim 9, wherein the one or more isolators are selected based on a design of the switchgear.

12. The switchgear arrestor system of claim 9, wherein the one or more ground leads are made of a conductive metal.

13. The switchgear arrestor system of claim 9, wherein the non-conductive insulated bar is made of fiberglass.

14. The switchgear arrestor system of claim 9, wherein the conductive grounding bar is made of conductive metal.

\* \* \* \* \*